Sept. 14, 1965  T. PRAXMARER ETAL  3,205,875
FOUR-CYCLE ROTARY INTERNAL COMBUSTION ENGINES
Filed Jan. 17, 1964  5 Sheets-Sheet 1

INVENTORS.
THOMAS PRAXMARER
NORBERT NESSLER
BY
*F. Ledermann*
ATTORNEY

INVENTORS.
THOMAS PRAXMARER
NORBERT NESSLER
BY
J. Ledermann
ATTORNEY

Sept. 14, 1965  T. PRAXMARER ETAL  3,205,875
FOUR-CYCLE ROTARY INTERNAL COMBUSTION ENGINES
Filed Jan. 17, 1964  5 Sheets-Sheet 3

INVENTORS.
THOMAS PRAXMARER
NORBERT NESSLER
BY
F. Ledermann
ATTORNEY

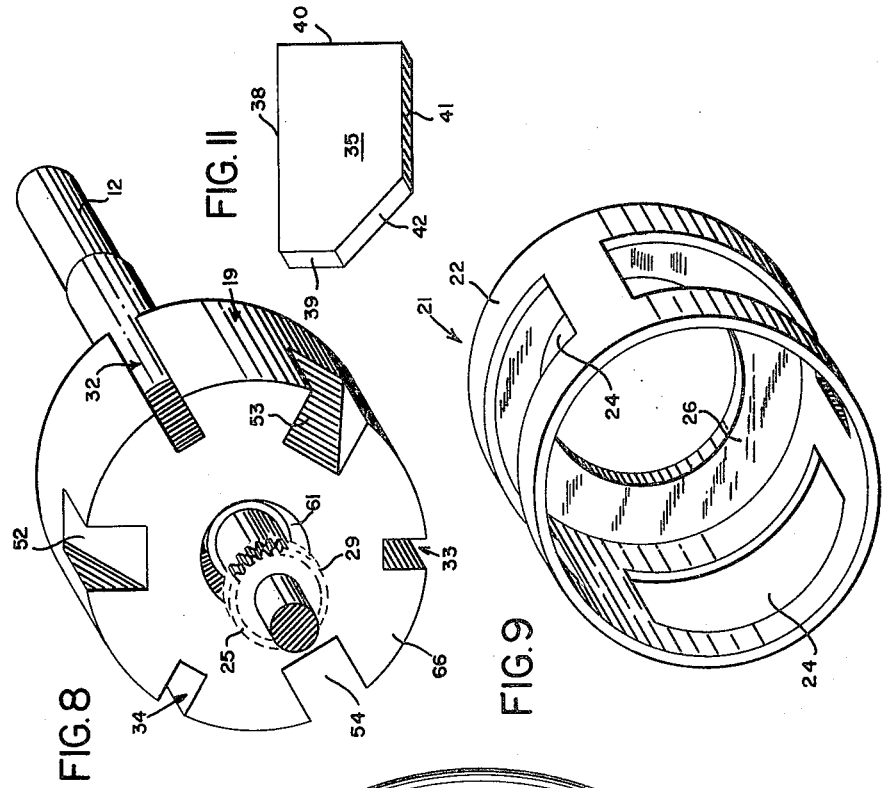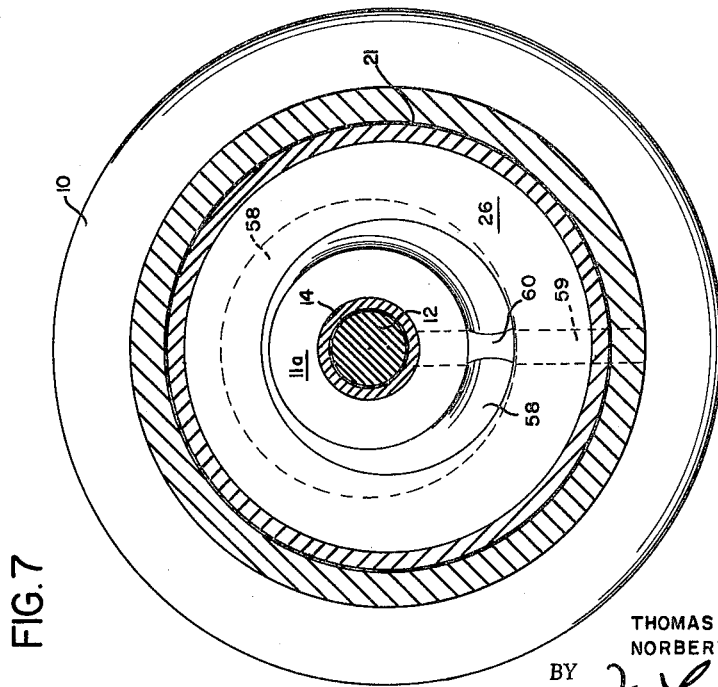

Sept. 14, 1965     T. PRAXMARER ETAL     3,205,875
FOUR-CYCLE ROTARY INTERNAL COMBUSTION ENGINES
Filed Jan. 17, 1964     5 Sheets-Sheet 5
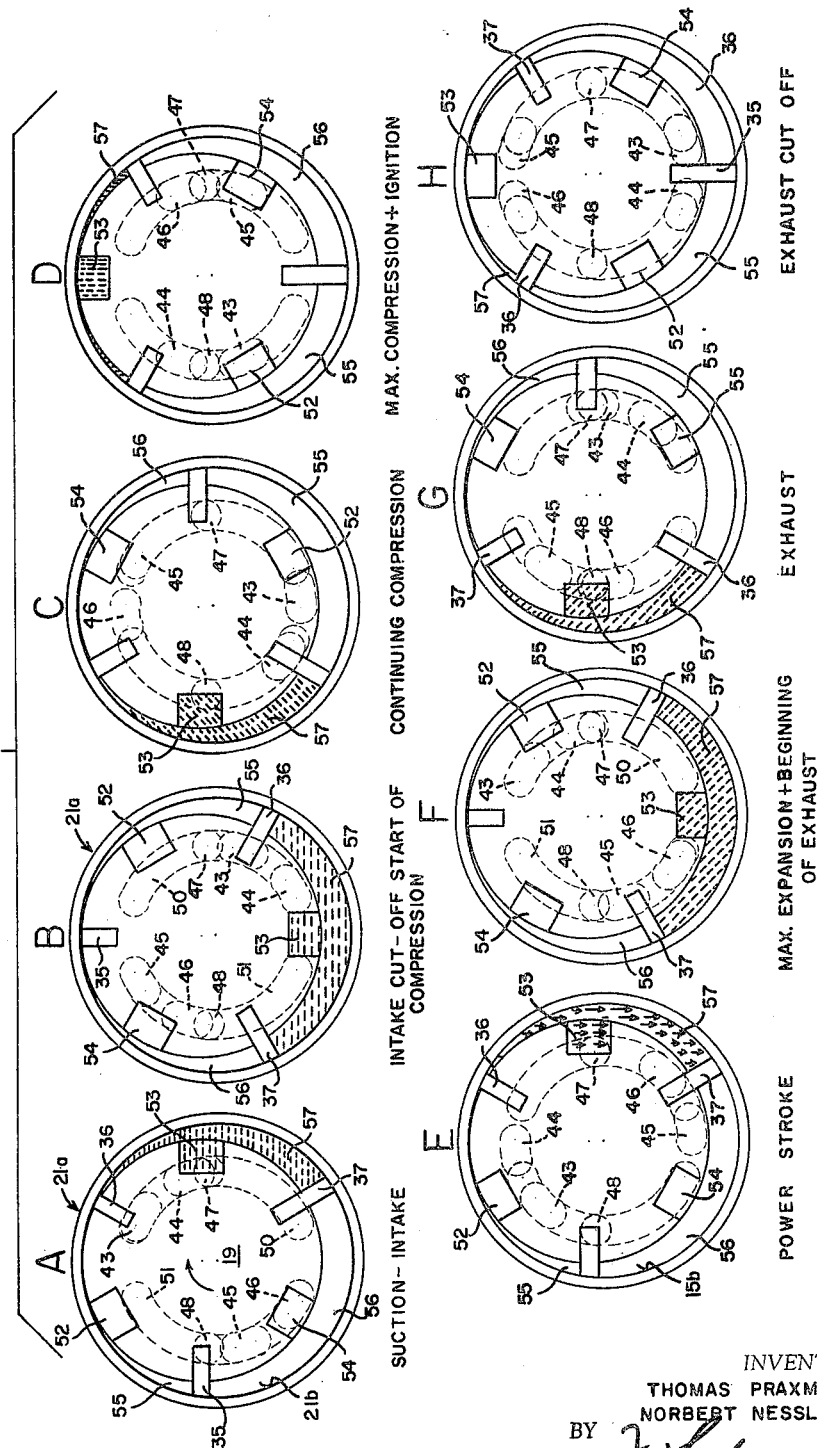
INVENTORS.
THOMAS PRAXMARER
NORBERT NESSLER
BY
F. Lederman
ATTORNEY

United States Patent Office 3,205,875
Patented Sept. 14, 1965

3,205,875
FOUR-CYCLE ROTARY INTERNAL
COMBUSTION ENGINES
Thomas Praxmarer, Lieberstrasse 1, and Norbert Nessler, Schubertstrasse 4, both of Innsbruck, Austria
Filed Jan. 17, 1964, Ser. No. 338,408
12 Claims. (Cl. 123—16)

This invention relates to internal combustion engines and aims primarily to provide a new and improved rotary internal combustion engine consisting basically of a casing enclosing a cylindrical chamber in which a cylindrical rotor is eccentrically mounted with the circumferential surface of the rotor in close proximity to the cylindrical wall of the chamber, the power shaft being coaxial with the rotor.

The present engine performs the same sequence of steps as is performed by a four-cycle reciprocating piston engine. In the example herein illustrated, a cover plate on one end of the casing is provided with suitably arranged and spaced openings or passages and a control disc, also provided with suitable passages, is interposed between the cover and the rotor. The disc is eccentrically geared to the power shaft but is concentric with the casing chamber, whence the control disc rotates at a slower rate than the rotor, which rate is predetermined.

Advantages of the instant engine are: it is composed of a small number of simple parts which may largely be produced by turning on a lathe; torque is produced by purely rotary motion; the four cycle equivalent sequence is attained without reciprocating valves but rather by a continuously rotating disc; the engine runs smoothly without vibration; the rotor also acts as an oil pump for lubrication, or the passages therethrough may serve for cooling; long life is assured by virtue of the small amount of relative motion between surfaces forming a seal; and the high speed of rotation combines high power output with small dimensions and little weight. Other advantages and uses will be obvious to persons skilled in the art.

The above as well as other and additional objects will become apparent in the following description, reference being had to the accompanying drawings wherein reference numerals designate parts named in the description. It is to be noted that the drawings are intended primarily for the purpose of illustration and that it is therefore neither desired nor intended to limit the invention necessarily to any or all of the details shown or described except insofar as they may be deemed essential to the invention.

Referring briefly to the drawings, FIG. 1 is a front elevational view of a rotary internal combustion engine embodying features of the present invention.

FIG. 7 is a sectional view taken on the line 7—7 of FIG. 2.

FIG. 8 is a perspective view of the power shaft and the rotor thereon, partly broken away and partly in section.

FIG. 9 is a perspective view of a cylindrical cage preferably used as an element of the engine.

FIG. 10 is a view diagrammatically illustrating the sequential positions of the rotor and associated parts of the engine through a cycle of operation.

FIG. 11 is a perspective view of one of the rotor slide vanes.

Figure 2:
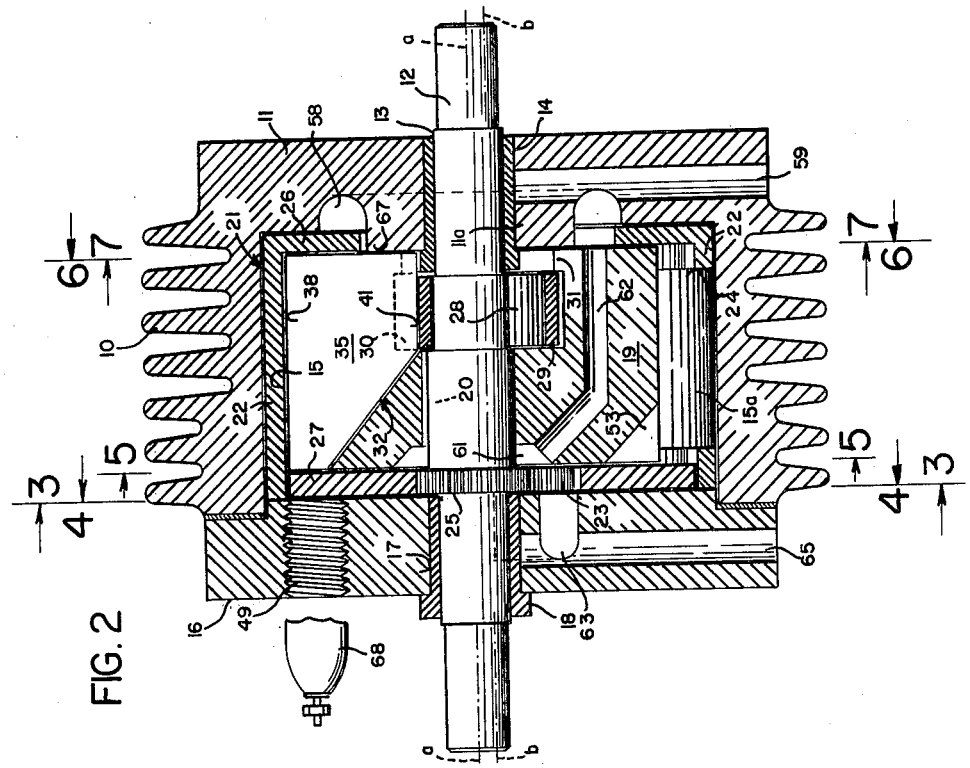
FIG. 2 is a sectional view taken on the line 2—2 of FIG. 1.

Referring in detail to the drawings, the numeral 10 indicates the casing or housing of the engine, which is supported in a stationary position by any suitable means, not shown. The casing includes a rear wall 11 which is shown integral therewith. A shaft 12 extends rotatably through a bore 13 provided with a bushing or bearing 14. The axis of the bore 13 and hence also of the shaft 12 is indicated by the two aligned dot-and-dash lines at the two ends of the shaft in FIG. 2, that is, the lines $a$, $a$, whereas the center line or axis of the cylindrical chamber 15 within the casing 10 is indicated by the two aligned dot-and-dash lines $b$, $b$; thus the shaft is eccentric to the casing chamber by an amount $e$, FIG. 1. The open front end of the casing is closed by a bolted cover plate 16 provided with a bore 17 aligned with the bore 13 and also provided with a bushing or bearing shown at 18.

A rotor 19 is fixed or keyed, as at 20, to the shaft 12 concentric with the shaft; the rotor has a front face 66 and a rear face 67. A unitary cylindrical cage, shown at 21, is rotatably mounted within the chamber 15 and, except for a necessary clearance sufficient to enable it to rotate within the chamber, it has the same diameter as the chamber. In the example illustrated, the cage has in its cylindrical wall 22 circumferentially spaced openings 24. Additionally, the cage is shown provided with an internal flange 26 at its rear, right-hand, end, FIGS. 2 and 9.

Figure 3:
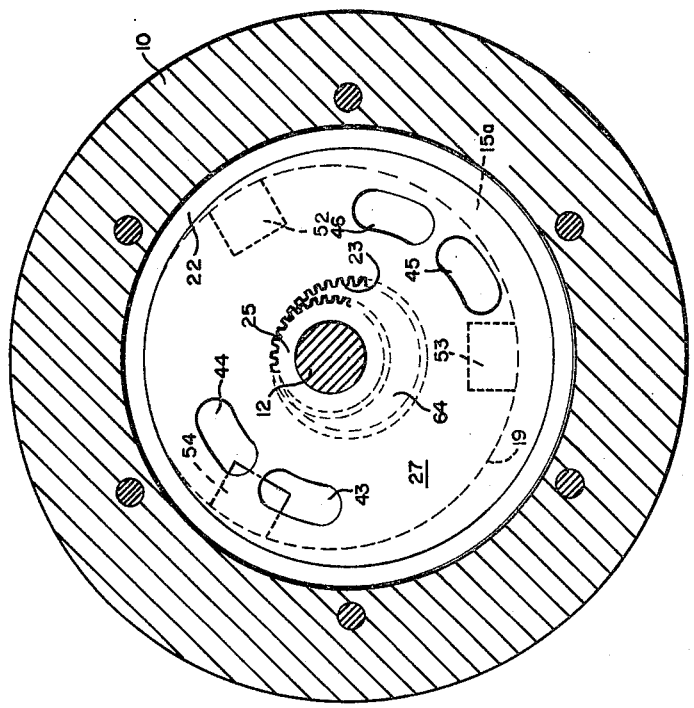
FIG. 3 is a sectional view taken on the line 3—3 of FIG. 2.

A space is provided between the cover plate 16 and the front face of the rotor in which a control disc, or valve plate, 27, is rotatably mounted concentric with the cage 21 and the chamber 15. As shown in FIG. 2, the diameter of the disc is equal to the internal diameter of the cage 21, again except for sufficient clearance to permit rotation of the disc within the confines of the front circumferential edge of the cage. The disc 27 is shown provided with a concentric internal gear 23 in mesh with an external gear or pinion 25 rigid on the shaft 12. The turn ratio between the gears 23 and 25 in the example illustrated is three to four, or one and one-half to two. It is obvious that the disc 27 rotates on the axis $b$, $b$, of the chamber 15 while the rotor 19 rotates on the axis $a$, $a$. Assuming that the meshing point or line of contact between the gears is shown in uppermost position in FIG. 2 and FIG. 3, then the rotor will always be, theoretically, in line contact with the uppermost portion of the cage 21, and there will always be between the rotor and the cage around the remainder of the circumference of the rotor what may be termed an elongated crescent-shaped space 15a whose maximum radial dimension occurs at a position diametrically opposite the said uppermost position.

Figure 6:
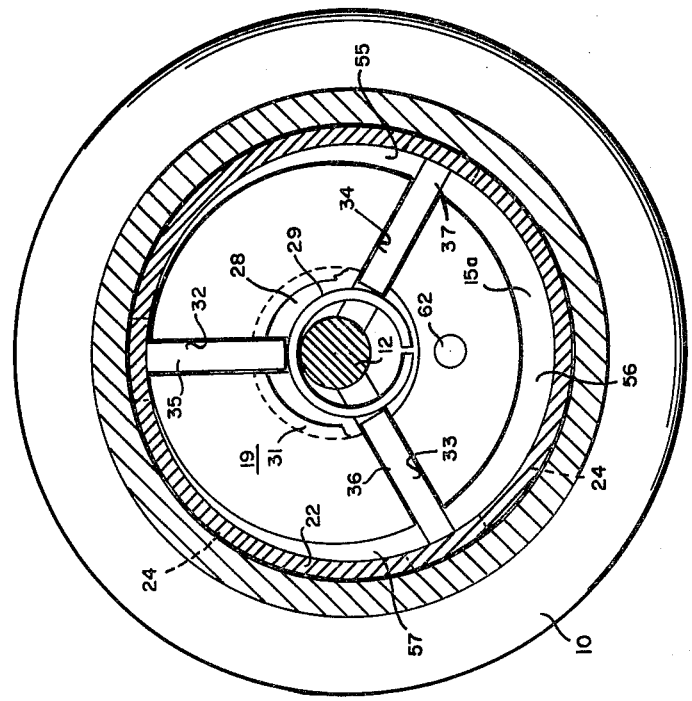
FIG. 6 is a sectional view taken on the line 6—6 of FIG. 2.

Shown loosely mounted within a cylindrical pocket 28 in the rotor 19 near the rear, right-hand, end thereof, FIG. 2, and also shown in FIG. 6, is a resilient split ring or spring 29. This spring is longitudinally constrained between the front wall 30 of the pocket and an internal flange 31, shown partly broken away in FIG. 6, at the rear end of the pocket. Three identical circumferentially equidistant slots 32, 33 and 34, FIG. 6, extend longitudinally of the rotor and radially into communication with the pocket 28. The slot 32 is shown in outline in FIG. 2. In each slot a vane having an outline complementary to that of the slot is radially slidably mounted; these vanes are indicated at 35, 36 and 37 for, respectively, the slots 32, 33 and 34. FIG. 2 also shows vane 35 registering in its slot 32. The vane 32 is shown in FIG. 11 having a long straight edge 38 which may be termed a wiper or wiping edge, extending the axial length of the rotor, a short front edge 39 and a longer rear edge 40, a base edge 41, and a sloping edge 42. Thus the vane is longitudinally confined between the disc 27 and the flange 26 of the cage 21; its base 41 is in contact with the spring 29 and its radially outer edge 38 is in contact with the wall 22 of the cage.

The spring 29 normally tends to expand and hence normally urges the vanes 35, 36 and 37 into wiping contact with the wall of the cage. It is now apparent that as the rotor turns about its axis the vanes will rotate with it but owing to the force of the spring 29 they will always be urged radially outward against the wall 22. The vanes will move radially inward as they approach the position of the vane 35 in FIGS. 2 and 6 and outward as they approach the diametrically opposite position.

The openings 24 in the cage are provided so that the force of the explosions, discussed below, will impinge largely upon the chamber wall rather than upon the cage wall 22. In practice, the cage 21 may be made proportionately thinner than shown in the drawings. However, the engine will operate in the manner set forth below without the interposition of the cage between the rotor and the chamber wall, but the cage is provided primarily to reduce friction between these parts.

The control disc 27 is shown to have diametrically opposite pairs of arcuate openings or ports 43, 44 and 45, 46. The cover is shown having two diametrically opposite circular ports 47 and 48, FIGS. 1 and 4, and a threaded opening 49 for reception of a spark plug 68. On its inner side the cover has opposed elongated arcuate grooves 50 and 51. The ports 47 and 48 communicate with and are positioned intermediate the length of, respectively, the grooves 50 and 51. As will be understood hereinafter, the grooves 50 and 51 make their respective ports act substantially as if they were arcuate openings having the length of the grooves.

Figure 1:
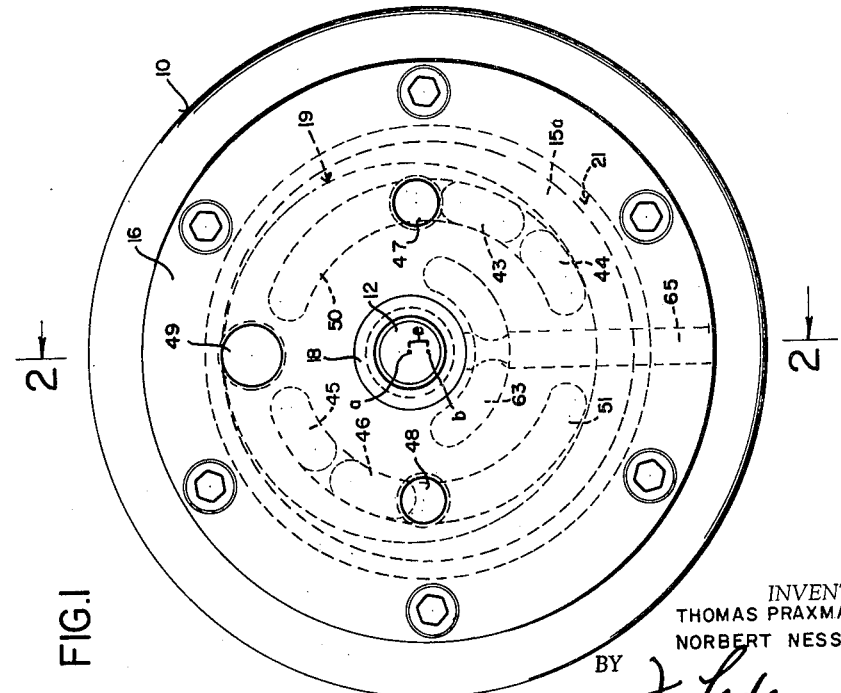

The cover 16 is fixed to the housing 10, and the control disc 27 rotates on the axis of the chamber 15, as is apparent. As shown in FIG. 1, the four arcuate ports 43, 44, 45 and 46 are all positioned concentric with the circular ports 47 and 48 and with the arcuate grooves 50 and 51. Hence as the disc 27 rotates, being driven by the rotor, the said four ports in the disc will always be concentric with the ports and grooves in the cover 16.

As best seen in FIG. 8, the rotor 19 has in its front face 66 three circumferentially equidistant identical peripheral notches 52, 53 and 54 which provide communication between that face of the rotor and the space between the rotor and the wall of the chamber 15. Each such peripheral notch is positioned midway between two mutually adjacent slots 32, 33 and 34. Thus the slide vanes 35, 36 and 37 provide three circumferentially spaced compartments 55, 56 and 57, FIGS. 6 and 10.

It is of course understood that suitable electric means for causing the spark plug to fire at desired intervals, not shown but easily within the capability of one skilled in the art of internal combustion engines, are to be provided for the present invention, and a timer forming part of such means may be driven, for example, off the shaft 12.

In order to simplify the description of operation of the engine, the cage 21a in FIG. 10, otherwise similar to the cage 21, is assumed to have no openings 24 therein, and its internal surface 21b is assumed to be equivalent to the wall of the casing 15, or the said internal surface may be considered as the wall of the chamber 15.

FIG. 10 illustrates, primarily diagrammatically, the operation of the engine through one complete cycle of two turns of the rotor, with emphasis on but one of the compartments defined between two slide vanes, that is, the compartment 57 and the rotor notch 53. Of course all three compartments 55, 56 and 57 with their respective rotor notches 52, 53 and 54 function successively in the same manner. In this figure the rotor circumference and its three notches, as well as the three slide vanes, are all shown in full lines; the grooves and ports in the cover 16 as well as the slots in the disc 27 are shown in broken lines; and the rotor, the disc 27 and the cover 16 are all superimposed one upon the other.

FIG. 10 shows eight sequential positions of the rotor, the positions being headed successively by letters of the alphabet from A through H, and descriptive legends are applied. It is to be noted that communication between the rotor notches and the arcuate grooves 50 and 51 (and hence the ports 47 and 48) is blocked by the disc 27 except during such time intervals as one or two of the slots 43, 44, 45, 46 in the disc are positioned between a rotor notch and an arcuate groove 50, 51 on the inner side of the plate 16.

Position A shows rotor notch 53 in communication with inlet port 47 directly as well as through slot 44; the direction of rotation of the rotor is indicated by the arrow as clockwise. The rotor, as noted above, turns at a higher r.p.m. than the disc 27; in the example illustrated, the rotor makes four turns to three of the disc. Thus it will be noted that in position B the slot 44 in the disc has fallen slightly behind the notch 53 as compared with the relative positions of these parts in position A.

In position A it is obvious that owing to the increasing volume or expansion of the compartment 57, suction has been and is being applied to the notch 53 and hence fuel mixture is being drawn into the said compartment. The fuel mixture in positions A and B is shown by horizontal hatching. In position B notch 53 reaches the lower end of the slot 44 (and the groove 50) and thus begins to shut off communication with the inlet port 47; in this position the compartment 57 has expanded to its maximum volume. As the compartment moves into position C, the fuel mixture now indicated by hatching slanting upward to the right, becomes progressively more compressed as the volume of the compartment is reduced; it will be noted that slot 44 continues to fall behind notch 53.

In position D compartment 57 has been reduced to its minimum with consequent maximum compression of the fuel mixture, now shown by vertical hatching. At this position the spark is passed to initiate ignition. It is to be understood, of course, that the rotor is continuously rotating at relatively high speed, so that although the spark is passed at the D position thereof, the actual complete explosion occurs after the compartment 57 has moved farther clockwise. This is consistent with the best practice in reciprocating piston engines, where the spark is passed just prior to beginning of the return stroke of the piston following maximum compression. Of course, any well known means for advancing or retarding the spark may be utilized if desired.

Position E shows the power stroke position of the compartment 57, the expanding mixture being indicated by arrow hatching. The expanding force is confined between the vanes 36 and 37, the surface of the rotor, and the wall 21b. Since the cross-sectional area of the compartment increases in a downward direction from near zero at the vane 36 to a maximum at vane 37, the explosive force will be directed downward and against the vane 37, thus causing the rotor to turn clockwise. When the rotor reaches position F, wherein the spent gases in the compartment are shown by hatching slanting upward to the left, notch 53 has just begun communication with slot 46 which, through groove 51, communicates with exhaust port 48, and in position G exhausting is advanced, having taken place partly via slot 45 and now largely occurring through slot 46. When the notch 53 reaches position H it is clear of communication with either slot 46, 45 so that the exhaust is shut off. From position H notch 53 again moves on into position A and the cycle is started again. However, the disc 27 having made only one and one-half turns while the rotor has made two turns in the cycle just described, as the compartment 57 begins its second cycle the relative positions of the slots 45, 46 and 43, 44, will be diametrically opposite the positions thereof shown in position A.

In the example of the engine illustrated and described, it is obvious that each of the compartments 55, 56 and 57 may be likened to a cylinder of a three-cylinder reciprocating piston engine. And since the rotor makes two turns per power stroke, which is similar to the two turns per power stroke of the piston of a reciprocating engine, the instant engine is equivalent to a four-cycle reciprocating piston engine.

From the present disclosure of a three compartment internal combustion four-cycle rotary engine, a change to such an engine having more or less than three such compartments or quasi-cylinders is attainable by skilled technicians without the need of exercising the inventive faculties, just as a multi-cylinder internal combustion reciprocating piston engine was a technical development following invention of a one-cylinder engine.

As stated above, each compartment or quasi-cylinder in the instant engine makes two complete revolutions per power stroke. Reference is now had again to FIG. 10, to consider another of the three compartments, for example, compartment 55 which immediately follows compartment 57 in rotational direction. Compartment 55 in position F has begun its suction stroke through rotor notch 52 and disc slots 43, 44, and in position G it is just approaching the intake cut-off position of compartment 57 in position B. In position H compartment 55 is just approaching the position of compartment 57 in position C, and so forth. In the same way the sequence of steps of compartment 56, which follows compartment 55, can be traced.

Passages or ducts for the flow of oil to lubricate the engine are shown in FIGS. 1, 2 and 4–7. A circular groove 58, FIGS. 2 and 7, is provided in the back wall 11 of the casing, concentric with the shaft 12 and communicating throughout its circumference with the back of the chamber 15; thus the groove defines a hub 11a around the shaft 12. A passage 59 extends radially from the bore 13 through the wall 11 and it also communicates with the groove 58 at 60, FIG. 7. As the groove 58 is concentric with the shaft it is of course eccentric to the flange 26 of the cage 21, whence in FIG. 7 the center of the cage is shown shifted downward with respect to the center of the shaft. Therefore only a crescent-shaped portion of the groove 58 is fully visible on the line 7—7 of FIG. 2. In FIG. 7 the entire groove 58 is bounded on the inside by the circumferential edge of the hub 11a and on the outside by the broken-line circle.

Figure 4:
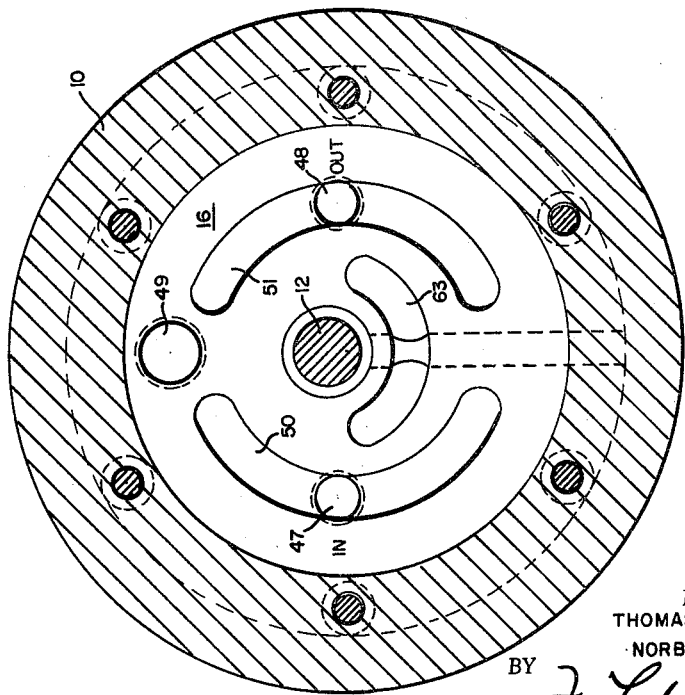
FIG. 4 is a sectional view taken on the line 4—4 of FIG. 2.
Figure 5:
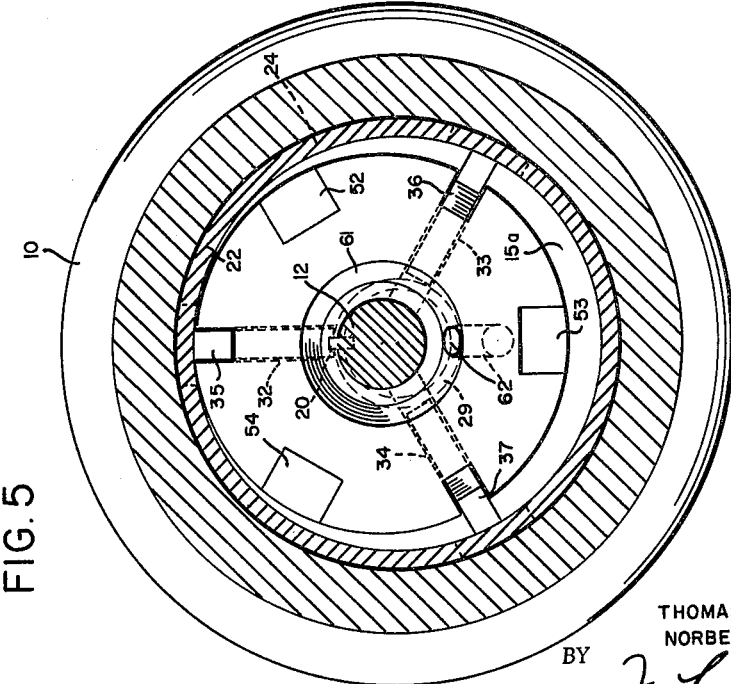
FIG. 5 is a sectional view taken on the line 5—5 of FIG. 2.

A beveled circumferential recess 61 is cut out of the front face 66 of the rotor coaxial with the shaft 12, FIGS. 2, 5 and 8. A longitudinal passage 62 is provided in the rotor between the recess 61 and the groove 58. An arcuate groove 63, FIGS. 1, 2 and 4, is provided in the cover 16 and it communicates throughout its length with the control disc 27 and particularly with the crescent-shaped space 64, FIG. 3, between the gears 23 and 25. A passage 65 extends radially through the cover 16 from the bore 17.

It is thus apparent that, given an oil supply tank or the like having one line connected, by any suitable means, to the outer end of the passage 65 and another line connected to the outer end of the passage 59, oil may be circulated through the rotating rotor to lubricate all moving parts and surfaces of the engine and casing.

The instant invention has necessarily been described with particular reference to the construction shown in the drawings, but such is not to be construed as a limitation upon the invention as various modifications in form and structure may be made without departing from the spirit and scope of the invention.

The invention having thus been described, what is claimed and desired to be secured by Letters Patent is as follows:

1. A four-cycle rotary internal combustion engine comprising a hollow casing enclosing a cylindrical chamber open at the front end, a cover plate covering said front end of the casing, a rotatable shaft eccentrically journalled in the ends of the casing, a cylindrical rotor fixed on the shaft concentric with the shaft and having a front face and a rear face, the rotor having a diameter such that the cylindrical surface thereof lies in close proximity to a portion of the chamber wall, the rotor having circumferentially equidistantly spaced vanes mounted radially slidably therein and defining compartments between the rotor and the chamber wall, the radially outermost edges of the vanes lying parallel to the axis of the rotor and constituting wiper edges, resilient means normally urging the vanes radially outward to engage the wiper edges thereof with the chamber wall, a disc rotatably mounted in the chamber between the rotor and the cover plate in slidable contact with the cover plate and the front face of the rotor and concentric with the chamber, reduction gear means connecting the disc with the shaft for rotation of the disc, a gas fuel intake opening and an exhaust opening extending through the cover plate, the rotor having a peripheral notch in the front face thereof substantially intermediate between each two mutually adjacent vanes providing communication with the compartment, plural through passage means in the disc providing selectively intermittent communication between said openings and said notches during rotation of the rotor, and spark ignition means for firing the fuel mixture in a compartment when the mixture contained therein has been compressed to a maximum degree which occurs when the compartment is reduced to minimum volume by virtue of its being in a position of closest proximity to the chamber wall, the turn ratio of the rotor to the disc provided by said gear means being equal to the number of vanes divided by the number of vanes plus one, said through passage means in the disc being so positioned that each compartment passes through two revolutions of the rotor between a first firing position and the next successive firing position.

2. A four-cycle rotary internal combustion engine comprising a casing enclosing a cylindrical chamber open at one end, a casing wall closing the other end of the chamber, a cover plate closing said open end of the chamber, a shaft eccentrically journalled in said casing wall and said cover plate, a cylindrical rotor rigidly mounted on the shaft within the chamber with one face thereof adjacent the open end of the chamber and with its cylindrical surface in close proximity to a portion of the chamber wall, the rotor having a given plural number of equidistantly circumferentially spaced radial slots extending thereinto through the cylindrical surface thereof, said slots having at their radially outermost ends a length equal to the axial length of the rotor and a substantially reduced length at their radially innermost ends, the rotor having an internal cylindrical axial pocket surrounding a portion of said shaft, said innermost ends of the slots extending radially into said pocket, a split expansion ring surrounding said portion of the shaft in said pocket, slide vanes complementary to said slots slidably mounted in the slots with the radially innermost ends of the vanes slidably engaging said spring, the vanes having an outline complementary to the slots, said spring normally urging the vanes radially outward from said surface of the rotor into wiping engagement with the chamber wall, the rotor having in said one face thereof a number of peripheral notches equal to the said number of slots with each notch positioned equidistant between two mutually adjacent slots, an annular control disc rotatably mounted concentric with the chamber in sliding contact with and between said cover plate and said one face of the rotor, reduction gear means connecting the shaft with the disc for rotation of the disc by the shaft, the cover plate having a threaded opening for reception of a spark plug positioned substantially in alignment with the position of closest proximity of the rotor to the chamber wall, the cover plate having two diametrically opposed ports therein spaced ninety degrees from the spark plug opening, the disc having at least two diametrically opposed arcuate slots therein concentric with said chamber and said ports, the cover plate having on the side thereof facing said disc two opposed elongated arcuate grooves concentric with said ports, each groove communicating at its midpoint with one of the ports, the opposed extremities of said grooves at each end thereof being mutually spaced at a distance substantially equal to the width of said notches, one of said ports constituting a fuel mixture intake, the other of the ports constituting an exhaust outlet, the reduction ratio of said gear means being equal to the number of said vanes divided by the number of said vanes plus one.

3. An engine according to claim 2, said given plural number being three.

4. A four-cycle rotary internal combustion engine comprising a casing having a cylindrical chamber therein open at one end, a casing wall closing the other end of the chamber, a cover plate closing said open end of the chamber, a shaft journalled in said end wall and cover plate eccentric to said chamber, a cylindrical rotor rigidly mounted on said shaft within the chamber with one face thereof adjacent the open end of the chamber and with its cylindrical surface in close proximity to a portion of the cylindrical wall of the chamber, the rotor having three circumferentially equidistantly spaced slide vanes mounted radially slidably therein, the radially outermost edges of the vanes being parallel with the axis of the rotor and providing wiper edges, resilient means normally urging the vanes radially outward into wiping contact with the chamber wall, a disc having an axial opening therethrough for the passage of said shaft rotatably mounted concentric with the chamber between and in sliding contact with said one face of the rotor and said cover plate, reduction gear means connecting the disc with the shaft for rotation of the disc at a rate of three turns of the disc to four turns of the motor, the rotor having in said one face thereof three identical peripheral notches with each notch positioned equidistantly between two mutually adjacent slide vanes, the disc having diametrically opposed pairs of relatively short arcuate slots therein concentric with the disc, the arcuate slots of each pair being closely spaced end to end, the cover plate having an arcuately elongated exhaust passage and a similarly elongated fuel mixture intake passage positioned concentric with said short arcuate slots, at least the midportions of the exhaust and intake passages extending through the cover plate and lying diametrically opposite each other, and suitably timed ignition means for firing an intaken fuel mixture occupying the space between mutually adjacent vanes once during each two revolutions of the rotor, each such said space between vanes sequentially taking in fuel mixture through said intake passage and compressing the same to a maximum during one revolution of the rotor and sequentially having the compressed mixture fired and exhausted through said exhaust passage during the immediate next revolution of the rotor, and means for firing the compressed mixture at the end of said one revolution of the rotor.

5. An engine according to claim 4, said elongated arcuate passages except for said midportions thereof comprising grooves on the side of the cover facing the disc.

6. An engine according to claim 4, the rotor having a cylindrical pocket therein surrounding the shaft and positioned remote from said one face thereof, the rotor having radial slots in which said slide vanes register, said slots extending radially inward through the surrounding wall of said pocket, said resilient means comprising a split ring confined within said pocket and in sliding contact with said vanes.

7. An engine according to claim 4, having interposed between the chamber wall and the rotor a rotatable cylindrical cage of substantially the same diameter as the chamber, the cage having spaced openings therein.

8. An engine according to claim 7, said cage having an internal flange thereon positioned between the other face of the rotor and said casing wall.

9. An engine according to claim 4, said elongated passages except for said midportions thereof comprising grooves on the side of the cover facing the disc, a cylindrical cage of substantially the same diameter as said chamber having an external flange, the cage being rotatably interposed between the rotor and the chamber wall with said flange interposed between the other face of the rotor and the casing wall.

10. An engine according to claim 9, said gear means comprising an internal gear on said disc in said axial opening thereof and an external gear on said shaft in mesh with the internal gear.

11. An engine according to claim 10, the rotor having in the front face thereof a circumferential recess surrounding said shaft, the cover having on the side thereof which faces the disc an arcuate groove whose extremities are positioned below the axis of the disc and which lies wholly below the axis of the disc and which is concentric with the axial opening in the disc and substantially aligned therewith, a passage extending radially through the cover into communication with said last-named groove, said casing wall having a circumferential groove therein on the side thereof facing the rotor, the rotor having a passage therethrough extending between said circumferential recess and the other face of the rotor, and a radial passage extending through said casing wall into said circumferential groove, whereby lubricating oil may be passed through the engine by entering through one of said axial passages and exiting through the other axial passage.

12. A four-cycle rotary internal combustion engine comprising a casing enclosing a cyclindrical chamber closed at one end, a shaft rotatably mounted in the chamber eccentric to the chamber, a cylindrical rotor fixed on the shaft and having a diameter such that the cylindrical surface of the rotor is positioned in close proximity to a portion of the cylindrical wall of the chamber, a cover plate secured to the casing and closing the open end of the chamber, the rotor having a predetermined plural number of vanes radially slidably mounted therein and circumferentially equidistant from each other thereby defining the ends of arcuate compartments between the rotor and the chamber wall, means normally urging the vanes radially outward into wiping contact with the chamber wall, a disc rotatably mounted between one face of the rotor and said cover plate concentric with the chamber, the cover plate having spaced intake and exhaust openings, the disc having spaced passages therethrough, the rotor having said predetermined number of peripheral notches in said front face thereof communicating with said compartments and positioned substantially intermediate the arcuate length thereof, speed reducing gear means between said shaft and said disc for rotating the disc by the shaft, the intake and exhaust openings in the cover plate and said passages in the disc all being positioned concentric with the chamber in a circular path whose projection into the chamber lies radially spaced from the chamber wall a distance equal to twice the distance between the axes of the shaft and the chamber, the arcuate spacing between said intake and exhaust openings and the openings in the disc being such relative to each other and to said notches and the reducing ratio of said gear means being such that during one revolution of the rotor fuel mixture is sequentially sucked into any given compartment and compressed to a maximum for firing of the mixture at the end of said one revolution and during the next immediate revolution of the rotor the fired fuel mixture is sequentially expanded and exhausted.

References Cited by the Examiner

UNITED STATES PATENTS

| | | | |
|---|---|---|---|
| 1,792,026 | 2/31 | Nichols | 123—16 |
| 3,076,446 | 2/63 | Lockhart | 123—16 |
| 3,114,354 | 12/63 | Simon | 123—16 |

FOREIGN PATENTS 24,559    1908    Great Britain.

DONLEY J. STOCKING, *Primary Examiner.*